H. R. GRENARD.
GATE HOOK.
APPLICATION FILED MAY 13, 1919.

1,334,997. Patented Mar. 30, 1920.

Inventor
Harvey R. Grenard

UNITED STATES PATENT OFFICE.

HARVEY R. GRENARD, OF SIOUX FALLS, SOUTH DAKOTA.

GATE-HOOK.

1,334,997.  Specification of Letters Patent.  Patented Mar. 30, 1920.

Application filed May 13, 1919. Serial No. 296,793.

*To all whom it may concern:*

Be it known that I, HARVEY R. GRENARD, a citizen of the United States, residing at Sioux Falls, in the county of Minnehaha and State of South Dakota, have invented certain new and useful Improvements in Gate-Hooks, of which the following is a specification.

This invention relates to gate hooks and more particularly to an improved device adapted to serve as a latch for engaging and maintaining a gate in closed position.

One of the objects of the invention is to provide a lever and link connection between a gate post and gate with a hook adapted to engage the gate whereby the operation of the lever will accomplish the release or latching of the gate to open and close the same.

A further object of the invention is to provide a device of this character which consists of comparatively few parts and is simple in construction but durable and well adapted to withstand the rough usage to which devices of this character are ordinarily subjected.

For a full description of the invention and the advantages and merits thereof, reference is to be had to the following description and accompanying drawings, in which—

Figure 1:
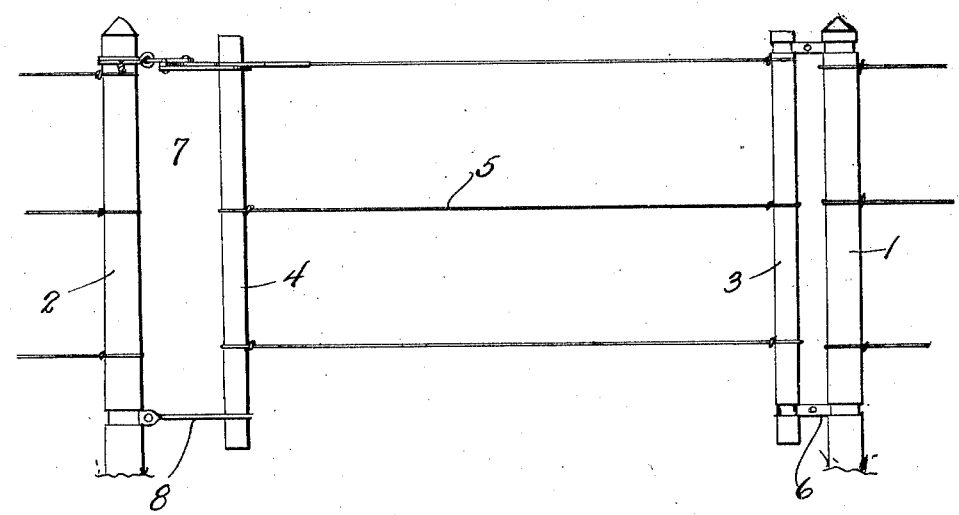
Figure 1 is a side elevation of the gate constructed in accordance with my invention and showing the latch hook in position thereon.

Referring to the drawings wherein is illustrated the preferred form of my invention, wherein like numerals of reference indicate like or corresponding parts throughout the several views, the gate post 1 forms a part of the fence and is disposed at one side of the gate opening. The opposite gate post is at the opposite side of the gate opening and also forms a part of the fence. The gate comprises the two bars 3 and 4 to which are attached the gate wires 5 which when the gate is opened are normally flat. The bar 3 is swingingly connected to the gate post 1 by the edge members 6. When the gate is closed, the relative positions of the gate post 2 and the bar 4 provide a relatively narrow gap 7 between the gate post and the end of the gate. Near the lower end of the gate post 2 is a loop member 8 adapted to receive the lower end of the bar 4 in a manner common to gates of this character. Attached to the upper end of the gate post 2 is a ring or loop 9 which carries an eye 10. Secured to the eye for swinging movement is a link 11 the opposite end of which is provided with a pivot pin 12. An operating lever 15 is pivotally mounted upon the pivot pin 12 and this lever comprises a handle 14 and the offset portion provided by the U-shaped member 15 through which the pivot pin 12 is extended. The gate post 4 is adapted to be grasped by a hook member comprising the straight portion 16 and the hook end 17 and the terminal of the straight portion is connected by a pivot pin 18 to the end of the operating lever as shown. The hook portion 17 is adapted to engage the bar 4 of the gate.

Figure 2:
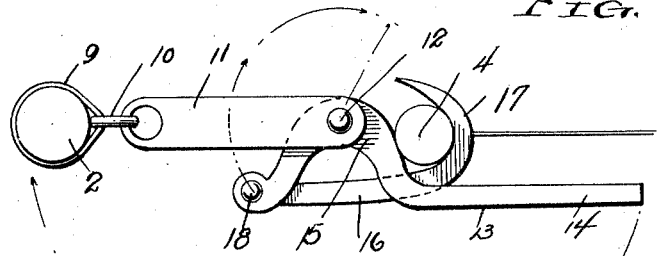
Fig. 2 is a plan view of the latch hook in the position it assumes when the gate is closed.

By referring to Fig. 2 it will be noted that the pivot pin 18 for the lever is in longitudinal alinement with the straight handle 14 so that the pivot pin 12 is considerably offset from a line drawn through the center of the handle 14 and the pivot pin 18. The hook being pivotally connected to the member 15 by the pivot pin 18 is adapted to engage the bar 4 so that swinging movement of the operating lever on the pivot 12 will draw the hook end of the hook member toward the gate post 2.

Figure 3:
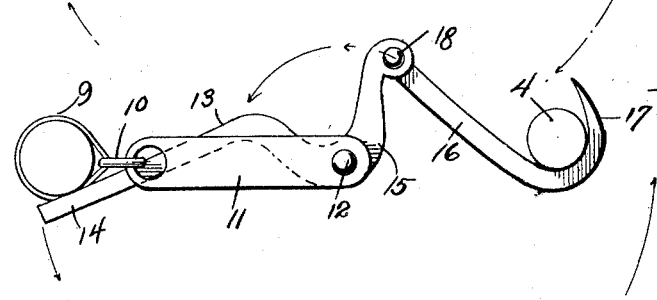
Fig. 3 is a similar view showing the latch hook in the position it assumes when the gate is opened.

In operation, the lower end of the bar 4 is engaged with the loop 8 after which the hook member 17 is passed around the bar 4 as shown to advantage in Fig. 3. When in this position, the operating lever is extended toward the gate post 2 by grasping the handle of the operating lever and swinging it on its pivot 12, the end to which the hook is attached as indicated at 18 will swing in the direction indicated by the arrows so that the hook member draws the bar 4 toward the gate post 2 and thus maintains the gate in closed position. During movement of the operating lever, the pivot 18 passes the longitudinal center of the link member so that the pull of the hook member urges the operating lever into engagement with the bar 4 as shown in Fig. 2, and since the pivoted members are thus placed off center it will be obvious that the gate can not be opened until the operating lever is swung to the position shown in Fig. 3 of the drawings.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent, is:—

1. In a gate hook, a link, a hook member having a hooked end and a straight shank, and an operating lever comprising an elongated handle portion and an offset end portion, the terminal of the offset end portion being pivoted to the straight shank of said hooked member, with the pivot in longitudinal alinement with the handle portion of said lever and the offset portion of the said lever being pivotally connected to one end of the link.

2. A gate hook including a post encircling loop, a link connected at one end with said loop, a U-shaped member pivoted to the other end of said link, a gate gripping member pivoted to one arm of the said U-shaped member and an extension on the other arm of said U-shaped member to provide an operating lever therefor.

3. A gate hook including a link bar having one end adapted for connection to a gate post, a U-shaped member pivoted to the other end of said link bar, one of the arms of said U-shaped member being elongated and bent to provide a lever normally projecting in the direction of the said link bar, and a gate engaging hook pivoted to the other arm of said U-shaped member and projecting opposite to said lever, said lever adapted upon being moved forwardly to reverse the position of said U-shaped member whereby the elongated arm of the said member may be disposed transversely of said hook and in proximity to the bight of the hook.

In testimony whereof I affix my signature in presence of two witnesses.

HARVEY R. GRENARD.

Witnesses:
 EDWARD A. WUNDERLICH,
 BENJIMAN F. KEITH.